Aug. 4, 1953   J. G. WRIGHT ET AL   2,647,702
WIRE REEL MOUNTING
Original Filed Jan. 18, 1947
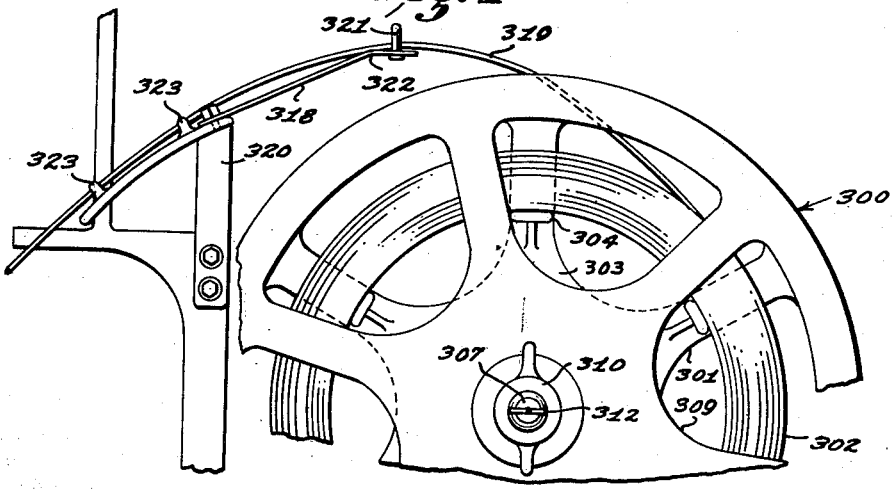
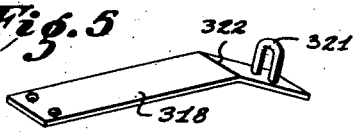
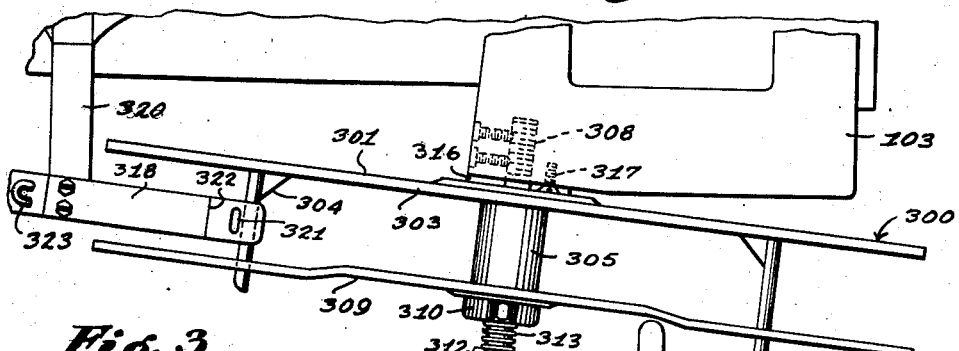
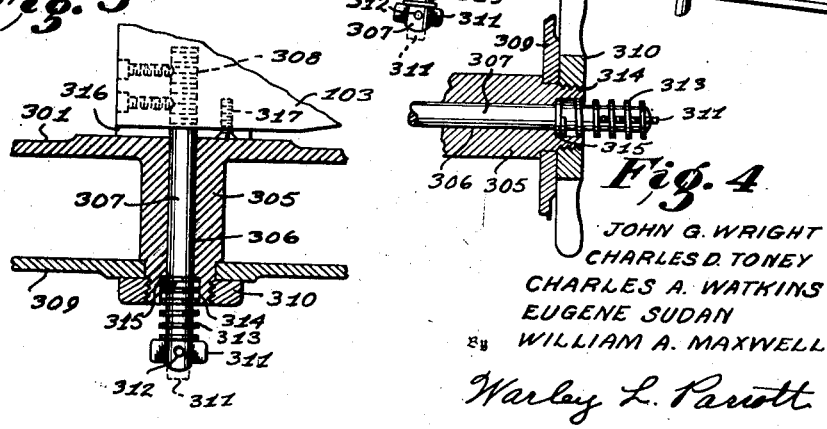
Inventors
JOHN G. WRIGHT
CHARLES D. TONEY
CHARLES A. WATKINS
EUGENE SUDAN
WILLIAM A. MAXWELL
By Warley L. Parrott
Attorney Patented Aug. 4, 1953

2,647,702

UNITED STATES PATENT OFFICE 2,647,702

WIRE REEL MOUNTING

John G. Wright, Charles D. Toney, Charles A. Watkins, and Eugene Sudan, Atlanta, and William A. Maxwell, Duluth, Ga., assignors to The Auto-Soler Company, a corporation of Georgia Original application January 18, 1947, Serial No. 722,806, now Patent No. 2,571,984, dated October 16, 1951. Divided and this application December 13, 1950, Serial No. 207,889

5 Claims. (Cl. 242—68)

This invention relates to fastener forming and inserting machines, and more especially to a nailing machine which is adapted particularly for woodworking operations, and by which fasteners are formed from a continuous length of wire or the like and inserted in material to be secured. This is a division of our copending application Serial No. 722,806, filed January 18, 1947, now U. S. Patent No. 2,571,984, granted October 16, 1951. The present divisional application is directed particularly to features of the arrangement provided for mounting the wire supply reel.

In the drawing:

Fig. 1 is a fragmentary side elevation illustrating the arrangement for mounting the wire reel;

Fig. 2 is a corresponding plan view;

Fig. 3 is a sectional detail of the wire reel mounting;

Fig. 4 is a further sectional detail illustrating the arrangement for removing the wire reel from the mounting; and Fig. 5 is a detail in perspective of the yieldable guide member used to avoid fouling of the wire on the wire reel.

The provision for mounting a supply of wire according to the present invention as indicated at 300 in Fig. 1 is illustrated more in detail in Figs. 2 to 5, inclusive. As a supply of wire is most conveniently handled in roll form, the mounting means 300 comprises a reel member 301 arranged to accommodate the supply of wire (represented at 302 in Fig. 1) as a roll. The reel member 301 is formed with a web portion 303 from which lateral arms 304 extend to support the roll of wire 302, and a hub portion 305 having a bore 306 (see Figs. 3 and 4) adapting the reel member 301 for rotative support on a spindle 307 fixed on the upper frame section 103 as shown at 308 in Figs. 2 and 3.

A retaining member 309 forming a second web portion is associated with reel member 301 for confining the supply of wire 302 on lateral arms 304. The hub portion 305 of reel member 301 is reduced in diameter toward its extending end to receive and position the retaining member 309, and the extending end of hub portion 305 is threaded to engage a wing nut 310 or the like to secure retaining member 309 in association with reel member 301.

The spindle 307 is provided in a length sufficient to extend beyond the hub portion 305 for spaced disposition of a retaining element 311 at its extending end. The extending end of spindle 307 is slotted for this purpose, and the retaining element 311 is assembled in the manner of a clevis with spindle 307 by a pivot pin 312. This retaining element 311 is used as a stop for a resilient positioning means, such as spring 313, provided to locate the reel member 301 on spindle 307 in relation to the machine. As shown in the drawing (Figs. 3 and 4), spring 313 is disposed on spindle 307 and bottomed in a counterbore 314 formed in hub portion 305. Accordingly, when retaining element 311 is extended from spindle 307 as a stop, spring 313 is confined between retaining element 311 and hub portion 305 to position the reel member 301 on spindle 307. A washer 315 may be inserted at the bottom of counterbore 314 to avoid any tendency of spring 313 to bind upon rotation of reel member 301.

It should also be noted that retaining element 311 is formed in a width no greater than the diameter of spindle 307, so that it may be pivoted to nest in the slotted end of spindle 307 as indicated by dotted lines in Figs. 2 and 3. This arrangement makes it possible, by compressing spring 313 slightly to pivot retaining element 311 and release spring 313 so that reel member 301 with the retaining member 309 assembled in place may be removed easily from the machine whenever desired; for example, when a different gauge of wire is to be used, in which case the new wire size may be disposed on another mounting means 300 to replace the one removed, which may then be used to store the former size wire for ready replacement. The new mounting means 300 is positioned by fitting spring 313 in place on spindle 307, and then compressing it slightly to allow retaining element 311 to be pivoted to an extending position again as a stop.

On the other hand, if the supply of wire 302 is exhausted and it is desired to replenish this supply, the retaining member 309 may be removed alone from the mounting means 300, by removing wing nut 310, both of which may be taken off of spindle 307 with retaining element 311 in extending position. A new roll of wire 302 may then be placed on the lateral arms 304 of reel member 301, and the retaining member 309 and wing nut 310 replaced, without disturbing any other elements of the mounting means 300. The above described arrangement accordingly provides selective means for removing the reel member 305 assembled with retaining member 309, or retaining member 309 alone, from spindle 307 as desired.

Wire is fed from the mounting means 300 by an intermittent action timed to the cyclic actuation of the fastener forming and fastener inserting operations, and this intermittent feeding exerts a jerking pull on the wire. To condition reel member 301 against coasting and consequent tangling of the wire as a result of this jerking pull, a braking surface is provided to restrain rotation of reel member 301 except under the load imposed by the above mentioned feeding action. This braking surface comprises an element 316 formed of a suitable friction material, such as leather. A convenient form for element 316 is as a washer surrounding spindle 307 and disposed on upper frame structure 103 with a surface in contact with reel member 301. The element 316 may be prevented from turning with reel member 301 by a screw fastening it to frame structure 103 as indicated at 317. Reel member 301 is held against element 316 by the pressure of spring 313, and while reel member 301 is free to rotate on spindle 307 to allow wire to be dispensed during feed, it is effectively restrained against rotation by the element 316 except under the load of the feeding action.

The above noted intermittent nature of the feeding action also causes difficulty in fouling of the wire 302 on reel member 301. This fouling results from the tendency of the jerking pull during feeding to imbed the winding of wire being fed in the other windings of roll 302 which causes wrapping and consequent binding of the windings. To obviate this result, a yieldable guide member 318 is disposed on the machine to direct wire, as indicated at 319 in Fig. 1, from reel member 301 for feeding.

The guide member 318 is mounted on a bracket 320 carried by upper frame structure 103, and is formed of a material such as spring steel combining sufficient strength and resilience for handling the wire 319. Guide member 318 extends from bracket 320 with a normally substantially straight disposition for a major portion of its length (see Fig. 1) such as to direct the wire 319 from reel member 301 without bending it beyond the curvature it has assumed in roll 302. A directing eye 321 is arranged at the extending end of guide member 318, and this extending end is angled, as at 322, with respect to the remaining body toward the reel member 301 in a generally tangent direction (as seen in Fig. 1) so as to allow guide member 318 to flex under the load of the feeding action without causing wire 319 to drag over its full extent. Beyond guide member 318, the wire 319 is trained through further directing eyes 323 on bracket 320.

With this arrangement, the guide member 318 is disposed to yield under the jerking pull incident to the intermittent feeding action and thus absorb the resulting shock. As guide member 318 is resilient, however, it will spring back to its original position upon recovery from this shock, and will accordingly exert dispensing pull on wire 319 to rotate reel member 301 sufficiently to make up for the wire fed. When relatively long fasteners are being formed and a correspondingly long feeding stroke is required, a combination of flexing by guide member 318 and rotation of reel member 301 may occur in dispensing the required length of wire 319. But in any case, as the reel member 301 is restrained against rotation by the braking surface of friction element 316, guide member 318 will flex first to absorb the irregularity in dispensing tension due to the jerking pull of the intermittent feeding and thereby avoid fouling of the wire 319 on reel member 301.

As noted above, the fastener forming and inserting machine of the present invention is particularly adapted for woodworking operations, and the arrangement of the various operating elements, as described above, is well suited to sturdy construction for heavy duty operations of this sort.

We claim:

1. Means for mounting a supply of wire in roll form for dispensing comprising a fixed spindle, a reel member for accommodating said supply of wire in roll form, a hub portion on said reel member formed with a bore adapting said reel member for rotative support on said spindle, a retaining member removably disposed on said hub portion in association with said reel member for confining a supply of wire on said reel member, means removably engaging said hub portion for retaining said reel member and associated retaining member in assembled relation, and retaining means disposed adjacent the extending end of said spindle for positioning said reel member and said associated retaining member thereon, said last mentioned retaining means being arranged for maintaining its positioning disposition while allowing said retaining member to be removed for renewing a supply of wire on said reel member, or for manipulation to allow said reel member and associated retaining member to be withdrawn as a unit from said spindle.

2. The mounting means defined in claim 1 further characterized in that an element formed of friction material is fixed surrounding said spindle to provide a braking surface restraining said reel member against rotation except under load, and a resilient element is disposed over said spindle in association with said last mentioned retaining means for pressing said reel member against said friction material element.

3. A reel assembly for dispensing wire from a roll comprising a spindle adapted for attachment to a supporting structure, a reel member having a hub portion formed with a bore adapting said reel member for rotative support on said spindle, a flange member removably disposed on said hub portion in association with said reel member for confining a roll of wire on said reel member, a retaining element mounted at the extending end of said spindle, resilient means disposed on said spindle between said retaining element and said hub portion for positioning said reel member on said spindle, means for manipulating said retaining element to release said resilient means and allow removal of said reel member and said associated flange member as a unit from said spindle, and means for removing said associated flange member alone to allow replacement of an exhausted wire supply on said reel member while allowing said retaining element to maintain its positioning disposition for said reel member on said spindle.

4. A device for dispensing wire from a roll comprising a rotatably supported reel member arranged to accommodate a roll of wire, and a wire withdrawal guiding means incorporating wire guides disposed in fixed relation to said reel member and a yieldable guide arm extending from said fixed wire guides toward said reel member for receiving and directing wire from said reel member to said fixed wire guides, the major portion of said yieldable guide arm normally having a substantially straight disposition and an extending end portion thereof being angled toward said reel member in a generally tangent direction, and said guide arm being yieldable toward the axis of said reel member to absorb irregularities in dispensing tension on said wire and thereby avoid fouling of the wire on said reel member, the normal substantially straight disposition of said guide arm allowing said yielding while still providing for directing wire from said reel member at a curvature greater than that at whcih the wire is disposed on said reel member.

5. Means for mounting a supply of wire in roll form for dispensing intermittently, said means comprising a fixed spindle, an element formed of friction material fixed surrounding said spindle to provide a braking surface, a reel member having a hub portion formed with a bore adapting said reel member for rotative support on said spindle, means disposed at the extending end of said spindle for positioning said reel member thereon and incorporating a resilient element for pressing said hub portion against the braking surface provided by said friction material element and thereby restraining said reel member against rotation except under load, and wire guiding means disposed for directing the dispensing of wire from said reel member, said guiding means incorporating fixed wire guides on said machine and a resilient guide arm extending therefrom toward said reel member for receiving and directing wire to said first mentioned wire guides, the major portion of said guide arm normally having a substantially straight disposition and an extending end portion thereof being angled toward said reel member in a generally tangent direction and fitted with a directing eye member, and said guide arm being yieldable toward the axis of said reel member to absorb irregularities in dispensing tension on said wire and thereby avoid fouling of the wire on said reel member, the normal substantially straight disposition of said guide arm allowing said yielding while still providing for directing wire from said reel member at a curvature greater than that at which the wire is disposed on said reel member.

JOHN G. WRIGHT.
CHARLES D. TONEY.
CHARLES A. WATKINS.
EUGENE SUDAN.
WILLIAM A. MAXWELL.

References Cited in the file of this patent

UNITED STATES PATENTS

| Number | Name | Date |
| --- | --- | --- |
| 84,065 | Locke | Nov. 17, 1868 |
| 143,137 | Goddu | Sept. 23, 1873 |
| 398,127 | Calley | Feb. 19, 1889 |
| 1,139,890 | Metzroth | May 18, 1915 |
| 1,388,846 | Brock | Aug. 30, 1921 |
| 1,462,487 | De Vry | July 24, 1923 |
| 2,253,848 | Cummings | Aug. 26, 1941 |
| 2,265,423 | Fass | Dec. 9, 1941 |
| 2,417,818 | Finn | Mar. 25, 1947 |